3,542,726
POLYESTER RESINS STABILIZED WITH DISULFIDES

Mary J. Stewart, Media, Pa., assignor to FMC Corporation, Philadelphia, Pa., a corporation of Delaware
No Drawing. Filed Apr. 23, 1968, Ser. No. 723,598
Int. Cl. C08g 51/58
U.S. Cl. 260—45.7                    7 Claims

ABSTRACT OF THE DISCLOSURE

A thermal stabilized polyester comprising a highly polymeric linear polyester and a compound selected from those represented by the formula $R_2S_2$ wherein R is a radical selected from the group consisting of lower alkyl and phenyl.

---

This invention relates to highly polymeric linear polyester resins that possess improved thermal stability and to a method of producing same.

The fiber and film-forming linear polyester resins used in the present invention, which are known as saturated linear polyesters, can be prepared by first carying out a condensation reaction between an aromatic dicarboxylic acid or ester thereof which does not contain any ethylenic unsaturation and a suitable diol to form a prepolymer. The resulting prepolymer is then polycondensed to form the desired saturated linear polyester resin. When an ester of a dicarboxylic acid is used as the starting material, it is first reacted with a diol in the presence of a transesterification or ester-interchange catalyst by means of an ester-interchange reaction; whereas when a dicarboxylic acid is used as the starting material, it is first subjected to a direct esterification reaction with a diol in the presence of what is generally called a first stage additive or ether inhibitor. In either instance, the resulting reaction product, which may be generally described as a polyester prepolymer, is then polycondensed in the presence of a polycondensation catalyst to form a polyester resin.

For example, in the case of the transesterification method of preparing polyethylene terephthalate, ethylene glycol is reacted with dimethyl terephthalate to form a polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Linear polyester resins, such as polyethylene terephthalate and others, are widely used in the production of films and fibers and the like. However, it is generally known that such polyester products degrade when exposed to heat for a substantial period of time. Such degradation is particularly a problem in the extrusion and spinning processes of the finished resins to form the above-denoted products. Additionally, the fibers produced from such resins are extensively used in the textile field and, as a result of this application, are subjected to rather extreme temperatures in the processes of washing, drying, and ironing. Therefore, it is highly desirable that the polyester resin composition possess as much stability at high temperatures as possible.

Therefore, it is an object of the present invention to prepare a highly polymeric linear polyester resin composition which exhibits improved thermal stability.

Another object of the present invention is to provide a method of preparing linear polyester resin exhibiting such a high degree of thermal stability.

These and other objects are accomplished in accordance with the present invention with a stabilized polyester composition comprising a highly polymeric linear polyester containing a stabilizing amount of a compound selected from those represented by the formula $R_2S_2$ wherein R is a radical selected from the group consisting of lower alkyl containing from 1 to 6 carbon atoms, and phenyl.

Among the disulfide compounds which can be used as thermal stabilizers in accordance with the present invention are phenyl disulfide, butyl disulfide, ethyl disulfide, and hexyl disulfide.

The highly polymeric linear polyester resins used in the preparation of the subject thermal stabilized polyester compositions can be prepared via either the conventional ester-interchange reaction or direct esterification method, both of which are thoroughly disclosed throughout the prior art.

In the practice of the present invention, the above-defined thermal stabilizer compounds can be incorporated in the resin composition at various stages. For example, in the preparation of polyester resin, the present thermal stabilizers can be suitably mixed in the polyester resin reactants before commencing the reaction or at any stage after the initial reaction has begun. However, it is generally preferred to thoroughly mix or blend the present thermal stabilizers in the polyester resin immediately after the polycondensation step has been completed, at atmospheric pressure, while the resin is still molten in order to form a uniform blend of polyester resin and a thermal stabilizer of the present invention.

It has been found that the present thermal stabilizers, as defined above, are effective as such in polyester resin compositions when employed in amounts ranging from about 0.01% to about 0.5%, by weight, based on the weight of the linear polyester resin. Usually, it has been found that concentrations ranging from about 0.02% to about 0.3%, by weight, are preferred in most instances. However, when indicated, concentrations less or greater than the above can be used, but their effectiveness is generally reduced proportionally.

The relative effectiveness of compounds as thermal stabilizers in polyester compositions can be most accurately expressed on the basis of percent broken bonds resulting from exposing a given resin composition containing such a stabilizer to elevated temperatures for a given period, rather than from a direct reading of the difference between the original or initial intrinsic viscosty and the final or degraded intrinsic viscosity of such a resin composition. It is known and logically expected that polyester polymers having higher original intrinsic viscosities will generally show a greater drop in intrinsic viscosity when exposed to elevated temperatures than those with lower original intrinsic viscosities, although on a percent broken bonds basis, the stability of such a resin composition having a higher original intrinsic viscosity might be equivalent to one exhibiting a lesser drop in intrinsic viscosity.

The percent broken bonds value, as determined for polyethylene terephthalate, is defined as the bonds broken per mole of ethylene terephthalate times 100, and the values given hereinbelow in the following examples were calculated by the use of the following equation:

$$\text{Percent Broken Bonds} = \left[\left(\frac{K}{V_f}\right)^{1/a} - \left(\frac{K}{V_i}\right)^{1/a}\right] \times 9.6 \times 10^3$$

The value of K and $a$ may be found in the literature, such as Conix, A., Makromol., Chemie 26, p. 226 (1958), wherein $K=0.00021$ and $a=0.82$. $V_f$ in the above formula is the degraded or final intrinsic voscosity value and $V_i$ is the original or initial intrinsic viscosity value.

For purposes of obtaining original or initial intrinsic viscosity values for insertion in the above equation, the original intrinsic viscosity values of the polyester resin products were obtained by measuring the intrinsic viscosities of the resin compositions as produced. The degraded intrinsic viscosity values for insertion in the above equation were determined by the following procedure: The polyester resin composition was ground and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. ($\pm 0.5°$ C.). The block was then sealed and evacuated to 0.1 mm. of mercury. After holding for about 10-15 seconds, the block was filled with dried, oxygen-free nitrogen gas. This vacuum-nitrogen purge was then repeated for a total of three times; the entire process took 5-7 minutes. Then, the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and such an intrinsic viscosity value is noted as the degraded intrinsic viscosity.

All of the intrinsic viscosity determinations of the polyester resin products produced in the examples below were determined in a 60% phenol-40% tetrachloroethane solution, wt./wt., at 30° C., according to conventional laboratory procedure.

EXAMPLE I

A blended mixture comprising 474 g. of terephthalic acid, 288 mls. of ethylene glycol and 149 mls. of triethyl amine was charged into a reaction vessel equipped with a nitrogen inlet, a Dean-Starke separating apparatus, heating means and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 230° C. over a one-hour period to remove all the triethylamine and any excess glycol. The prepolymer product was allowed to cool under an atmosphere of nitrogen.

EXAMPLE II

Fifty grams of the prepolymer product of Example I was mixed with 0.02 g. of antimony sec-butoxide and placed in a reaction vessel. The reaction mixture was heated at about 280° C. under a residual nitrogen reduced atmosphere of from about 0.05 to about 0.1 mm. of mercury while under agitation for about 2 hours to bring about the polycondensation of the polyester prepolymer and formation of a filament- and film-forming polyester resin having an original intrinsic viscosity of 0.88. The percent broken bonds of the resulting polyethylene terephthalate resin per the above-defined testing procedures and equation was calculated as 0.132%.

EXAMPLE III

Fifty grams of the prepolymer product of Example I was mixed with 0.02 g. of antimony sec-butoxide and placed in a reaction vessel. The reaction mixture was heated at about 280° C. under a residual nitrogen reduced atmosphere of from about 0.05 to about 0.1 mm. of mercury while under agitation for about 2 hours to bring about the polycondensation of the prepolymer and formation of a polyester resin as in Example II. After the polycondensation reaction had been completed, 0.02 g. of phenyl disulfide, $(C_6H_5)_2S_2$, was thoroughly stirred into the polyester resin while still molten at atmospheric pressure, after which the filament- and film-forming resin product was cooled. The percent broken bonds of the resulting polyethylene terephthalate resin composition per the above-defined testing procedures and equation was calculated as 0.047%.

EXAMPLE IV

Fifty grams of the prepolymer product of Example I was mixed with 0.02 g. of antimony sec-butoxide and placed in a reaction vessel. The reaction mixture was heated at about 280° C. under a residual nitrogen reduced atmosphere of from about 0.05 to about 0.1 mm. of mercury while under agitation for about 2 hours to bring about the polycondensation of the prepolymer and formation of a polyester resin as in Example II. After the polycondensation reaction had been completed, 0.02 cc. of ethyl disulfide, $(C_2H_5)_2S_2$, was thoroughly stirred into the polyester resin while still molten at atmospheric pressure, after which the filament- and film-forming resin product was cooled. The percent broken bonds of the resulting polyethylene terephthalate resin composition per the above-defined testing procedures and equation was calculated as 0.060%.

EXAMPLE V

Fifty grams of the prepolymer product of Example I is mixed with 0.02 g. of antimony sec-butoxide and placed in a reaction vessel. The reaction mixture is heated at about 280° C. under a residual nitrogen reduced atmosphere of from about 0.05 to about 0.1 mm. of mercury while under agitation for about 2 hours to bring about the polycondensation of the prepolymer and formation of a polyester resin as in Example II. After the polycondensation has been completed, 0.02 cc. of hexyl disulfide, $(C_6H_{13})_2S_2$, is thoroughly stirred into the polyester resin while still molten at atmospheric pressure after which the filament- and film-forming resin product is cooled. The percent broken bonds of the resulting polyethylene terephthalate resin composition per the above-defined testing procedures and equation is calculated as less than 0.065%.

The results in the above examples indicate that the present compounds when added to linear polyester resins, act to stabilize or reduce the degradation effects of higher temperatures upon such polyester resins. When the control above, Example II, is compared with Examples III, IV, and V, wherein a thermal stabilizer of the present invention is incorporated in the resin composition, it can readily be seen from the percent broken bonds values that the present stabilizers act to limit the amount of degradation that takes place when polyester resin products are exposed to elevated temperatures for prolonged periods of time.

The present invention has been illustrated with particular respect to the stabilization of polyethylene terephthalate. However, the present thermal stabilizers are also effective in stabilizing any fiber and film-forming linear polyesters and copolyesters; for example, those derived from aromatic dicarboxylic acids, such as isophthalic acid, and 4,4′-diphenyldicarboxylic acid, or ester derivatives thereof, and suitable diols, such as glycols of the series $HO(CH_2)_nOH$, where $n$ is 2 to 10.

It will be apparent that various different embodiments can be made practicing this invention without departing from the spirit and scope thereof, and therefore, it is not intended to be limited, except as indicated in the appended claims.

I claim:
1. A stabilized polyester composition comprising a linear saturated polyester containing a compound selected from those represented by the formula $R_2S_2$, wherein R is a radical selected from the group consisting of lower alkyl and phenyl.

2. The composition of claim 1 wherein the polyester is polyethylene terephthalate.

3. The composition of claim 1 wherein the compound is present in an amount ranging from 0.01% to about 0.5%, by weight, based on the weight of the linear polyester.

4. The composition of claim 1 wherein the compound is phenyl disulfide.

5. The composition of claim 1 wherein the compound is ethyl disulfide.

6. The composition of claim 1 wherein the compound is butyl disulfide.

7. The composition of claim 1 wherein the compound is hexyl disulfide.

References Cited

UNITED STATES PATENTS

| | | | |
|---|---|---|---|
| 2,258,188 | 10/1941 | Matheson et al. | 260—45.7 |
| 2,643,241 | 6/1953 | Crouch et al. | 260—45.7 |
| 3,175,992 | 3/1965 | Anderson | 260—45.7 |
| 3,304,283 | 2/1967 | Hawkins et al. | 260—45.9 |
| 3,331,809 | 7/1967 | Mauz | 260—45.85 |
| 3,462,391 | 8/1969 | Stewart | 260—45.7 |

DONALD E. CZAJA, Primary Examiner

R. A. WHITE, Assistant Examiner